Patented Oct. 12, 1948

2,450,953

UNITED STATES PATENT OFFICE 2,450,953

ESCHAROTIC SOLUTION FOR DEHORNING CALVES

James E. Guthrie, Ashland, Ohio, assignor to Dr. Hess & Clark, Inc., Ashland, Ohio, a corporation of Ohio No Drawing. Application June 3, 1946, Serial No. 674,048

2 Claims. (Cl. 167—53.2)

The present invention relates to a new and improved composition particularly useful for dehorning calves.

Horns on cattle are detrimental to the welfare of the other members of the herd, and livestock men recognize the fact that it is more profitable to care for cattle which have been dehorned. This is especially true of the beef cattle industry, and dairymen with the exception of those who raise pure-bred animals for breeding and show purposes likewise prefer dehorned animals. Since horns are a source of injury to other members of the herd, it is necessary to either remove them surgically after the animal reaches maturity or to resort to the use of caustic or escharotic applications to destroy the developing horns when the animal is a few days of age.

Surgical removal of horns on mature animals is attended by some danger for the loss of blood is considerable unless the hemorrhage is skillfully controlled. There is also the possibility that infection of the frontal sinus will take place, considerably reducing the vitality of the animal to a point where weight is lost or in some cases the animal may die.

The commonly used caustic pastes consist of sodium hydroxide, calcium hydroxide or a combination of both in an aqueous base. These pastes are applied to the developing horn in small quantities when the calf is a few days old. Escharotic pastes of this type are very irritating and the animal is in considerable pain while the tissues are being destroyed. Water is extracted from the tissues and the caustic substances are often carried down the side of the head and sometimes into the eyes resulting in an excessive destruction of tissue. Nursing calves may rub the paste on the dam's udder and flank and produce severe burning of these tissues.

A primary object of the present invention is the obviation of the prior art defects and disadvantages as hereinbefore outlined, by the embodiment of escharotic compositions which are useful in dehorning calves without, however, entailing the aforesaid defects and disadvantages.

This and other objects and advantages of the present invention are realized by the present invention which is based upon the discovery that a solution of antimony chloride, as an escharotic substance, in a nitro-cellulose lacquer containing a suitable plasticizer is particularly suitable for destroying the developing horns on young calves. This escharotic solution dries quickly into a flexible film which adheres to the tissues and prevents the caustic chemical from being rubbed off by the calf. The tissues are gradually destroyed with the formation of a dry, firmly adhering eschar which comes away in about three weeks time leaving a completely healed surface.

The nitrocellulose lacquer may be prepared as a solution of nitrated cellulose (nitrocellulose) in, for instance, ether or alcohol or a mixture thereof or in any other suitable and easily volatile solvent. Any of the conventional plasticizers, such as camphor, castor oil or the like may be incorporated as flexibilizer. A presently-preferred lacquer for the purposes of the present invention is Flexible Collodion U. S. P. XII which contains the requisite plasticizing means incorporated therein.

An example of a preferred escharotic solution according to this invention is as follows:

| | Parts by weight |
|---|---|
| Flexible Collodion U. S. P. XII | 25 |
| Antimony trichloride | 10 |

The antimony trichloride is weighed out and quickly ground to a fine particle size. The Flexible Collodion U. S. P. XII is then added and the mixture stirred. After the two ingredients are intimately mixed together, there is formed a coagulated mass which precipitates but which gradually goes into solution within a few hours. This caustic solution must be kept in well stoppered bottles to avoid evaporation.

The application of the escharotic agent to the young calf's horns is preferably as follows. The hair is clipped as closely as possible over and around the developing horn button so that a clean dry area about the size of a half dollar is exposed. The escharotic solution is applied over the developing horn and contiguous skin, covering an area about the size of a quarter. The calf should be restrained for a few minutes until the solvent evaporates and the collodion forms a film. Blowing the breath on the area will hasten evaporation and formation of the film.

When the collodion film has formed, it adheres to the tissues and holds the escharotic agent in intimate contact with the tissues until the horn button and surrounding skin are destroyed. The whole area undergoes a dry necrosis with the formation of an eschar which is impervious to water and infection. Young calves dehorned with this agent do not have to be kept out of the rain once the collodion film has hardened. Neither is it necessary that the animal be kept away from its dam for fear of burning the udder and flanks.

The foregoing exemplifies my preferred method of carrying out the invention but it will be understood that the ingredients in the formula may be used in quantities other than specified in the said illustrative example.

Having described my invention what I claim is:

1. A dehorning solution for dehorning young calves comprising antimony chloride, as sole active dehorning ingredient, dissolved in a nitrocellulose lacquer.

2. A dehorning solution for dehorning young calves comprising antimony chloride, as sole active escharotic ingredient, dissolved in a nitrocellulose lacquer and containing these ingredients in a proportion by weight of 25 to 10.

JAMES E. GUTHRIE.

REFERENCES CITED

The following references are of record in the file of this patent:

UNITED STATES PATENTS

| Number | Name | Date |
|---|---|---|
| 627,296 | Camnitzer | June 20, 1899 |

OTHER REFERENCES

Hiss & Ebert, New Standard Formulary, 5th ed. (1920) page 34 (copy in Div. 43).

Winslow, Veterinary Materia Medica, 8th ed. (1919), page 496.

Dun, Veterinary Medicines (1880), page 175 (copy in Div. 43).

Diseases of Cattle (1912), page 299, copy in Div. 43.